UNITED STATES PATENT OFFICE.

DANIEL E. SOMES, OF WASHINGTON, DISTRICT OF COLUMBIA.

IMPROVED PROCESS OF GENERATING GASES TO BE USED FOR MOTIVE POWER.

Specification forming part of Letters Patent No. 53,695, dated April 3, 1866.

*To all whom it may concern:*

Be it known that I, DANIEL E. SOMES, of Washington, in the District of Columbia, have invented a new and useful Process by which Gas or Steam may be Generated and Used as a Motive Power, of which the following is a specification.

The nature of my invention consists, first, in combining or mixing with water or steam gunpowder and converting the compound into gas and using it as a motive power; second, combining with water or steam an explosive compound or substance and converting the same into gas and using it as a motive power; third, in combining with water or steam sulphur, saltpeter, and charcoal, and converting the same into gas, to be used as a motive power; fourth, in combining with water or steam sulphur and saltpeter and converting the same into gas to be used as a motive power; fifth, in combining nitric acid with water or steam and converting the same into gas or vapor and using it as a motive power; sixth, in combining sulphurous acid with water or steam and converting the same into gas and using it as a motive power; seventh, in combining sulphuric acid, alcohol, air, and water or steam, and converting the same into gas and using it as a motive power; eighth, in combining sulphurous acid, saltpeter, charcoal, air, and water or steam, and converting the same into gas and using it as a motive power; ninth, in combining petroleum or other oil, alcohol, and saltpeter. and converting the same into gas and using it as a motive power; tenth, in combining petroleum or other oil, saltpeter, sulphuric acid, or their equivalents, and introducing the same through the medium of steam or water into the generator hereinafter described, and converting them into gas and using it as a motive power, or for any other purpose to which it may be adapted; eleventh, in combining any two or more of the foregoing substances, or with any of the following—namely, oil of turpentine, liquid carbonic acid, hydrogen, sulphureted hydrogen, and chlorine—with air, phosphureted hydrogen, naphtha, or ammonia, and converting them into gas or vapor and using the same as a motive power or as fuel.

In order to accomplish the object of my invention, I construct a gas or steam generator of iron, steel, or copper, lined with platinum, plaster-of-paris, fire-brick, pipe-clay, soapstone, or any material that will resist the action of acids and a high degree of heat.

As this generator is not intended to carry or hold water, but simply to convert any liquid or vapor that may enter it into gas, to be conducted to a receiver or to the engine direct as fast as it is made, it may be much smaller than any steam-boiler designed to do the same amount of work, and may be made wholly of platinum without great expense. The generator may be corrugated, or its outer surface fluted and surrounded by a casing, which may also be corrugated or fluted, thereby forming numerous flues for conducting heat and smoke, and also to increase its heating-surface. Around and near this casing I also place another composed of two plates set a few inches apart, forming a tight chamber or chambers between them, designed to be filled with water for the double purpose of generating steam with any surplus heat that may accumulate in heating the generator, and for protecting tubes, as hereinafter described.

I insert tubes in the generator, extending through it and opening at both ends into the flues. I also place small tubes opposite those above described, extending outward from the flues through the water-chamber, whose office is to conduct steam or gas of the ordinary kind, or any combustible gas or air or steam. I also place other tubes near those last described, whose inner ends are opposite blocks of platinum, steel, soapstone, fire-brick, pipe-clay, or their equivalents, which are strongly attached to the generator. An air-chamber or channels outside the water-chamber is constructed to hold the air or gas which is forced through the said tubes.

I will now describe the operation of heating the generator. A fire is started at or near the bottom of the flues, which is fed with petroleum, gas, coal, or any other combustible substance; but that which will make the most flame is preferable. Combustible gas or air is forced into the air-chamber and through the small tubes and into the flues by means of a fan-blower, bellows, air-pump, or their equivalents. and is ignited by the flames in the flues and forced in the form of a tongue of fire of intense heat into the tubes in the generator or against the blocks aforesaid. Jets of fire, as from a common gas-burner, may be substituted for the flames in the flues, or may be used in connection therewith. The water in the chamber protects the tubes running through it against being melted or burned by the fire in the flues. I have another way of protecting them, which consists in making them double; or, in other words, I place a tube within a tube with the end of the outer one tight, and filling the chamber between the two with water and providing for a constant supply as well as for the escape and use of the steam that may be generated, which is done by forcing water into the tubes in the usual way and letting the steam escape into a chamber, to be used as motive power or as fuel.

Instead of using water, as set forth, I sometimes use soapstone, plaster-of-paris, or fire-brick in place of the water-chamber through which the tubes are extended, though I prefer the former plan.

I also construct and place near the generator another vessel, designed to hold in solution the compound for making the gas. It should be made of copper, glass, soapstone, or some other material that will resist the action of acids and alkalies. These two vessels are connected by means of pipes or tubes made of material similar to that of the generator. These are made in sections, so as to be replaced by others when worn out or in need of repair. The design of these tubes is to conduct the liquid compound from the latter vessel to the generator while heated to such a degree as to partially heat said compound while on its passage.

Instead of several tubes a large block of metal with numerous holes through it may be used. This block or said tubes may be heated in the same manner that the generator is, or in any desirable way, or the heating of them may be dispensed with altogether.

The generator is intended to be kept at a red or white heat, so that the compound shall be instantly converted into gas or steam on its entrance, and then conducted to a receiving-chamber or to the engine direct.

In order to produce a powerful draft in the flues, and at the same time to prevent the escape of any offensive odor, as well as for the sake of economy, I use suction-blowers or air-pumps, or their equivalents, for drawing the gas from the engine after it has performed its office, and the smoke from the flues, and forcing them into cold chambers for the purpose of condensing them. In the chamber where the smoke is condensed are numerous jets of water or spray, forced in different directions. There is also a partition, which is kept constantly wet, and which has a large number of small holes through it. The smoke is driven through the spray against this perforated partition, and is separated from the air, which is forced through the small holes and against another wet partition near it, which is also perforated. By this time the air will have deposited all of its impurities, and is then conducted through a circuitous flue or channel to the atmosphere without. Wire-gauze may be used instead of partitions, as described. A screw is a good device, running in a cylinder, for forcing the smoke or steam.

The gas or steam, after leaving the engine, I force into a cold chamber or through cold pipes, or both, and condense it in the manner described above for condensing the smoke, or in any desirable way, and use whatever is valuable for making gas or is valuable for any purpose.

Instead of condensing, as above described, I prefer to force the smoke and spent gas and steam from the engine and smoke-pipe through pipes or channels into the fire-box or flames, to be consumed, thus preventing the escape of offensive odors and economizing in the use of fuel. This I do with the same kinds of machinery which are used for forcing the smoke and gas into the cold chambers or tubes for condensing, as set forth.

I force the compound into the generator by means of a pump, or I force air into the vessel containing the compound. After the compound has been put into the vessel the small opening is closed with a screw-stopper, or is in some other way securely closed. The air is then forced in above the top of the liquid compound with a sufficient amount of pressure to force the liquid into the generator. Air is also forced into the generator, either with the liquid or by itself, when desirable to mix with steam or gas.

The mode above described for producing draft and for condensing smoke and steam by suction pumps or blowers or screw I intend to apply to steam-vessels, locomotives, stationary engines, and the like now in use. I also apply the double tubes, the outer one being filled with water or steam, to fire-boxes, furnaces, and the like, for the purpose of introducing air or combustible gases into said fire-boxes, furnaces, and the like, to increase the heat and to economize in the use of fuel. In smelting ores or minerals these tubes, conducting air or combustible gases through the sides and bottoms of the furnaces, pointing in all directions, will be found to be valuable, especially when applied to the precious metals. The steam which is generated by the heat coming in contact with these pipes can be used to advantage in propelling the machinery which forces the air or gas or steam into the furnaces through said pipes or water-chambers.

Having thus described my invention, what I claim as new, and desire to secure by Letters Patent, is—

1. The apparatus for generating steam or gas to be used as a motive power, substantially as described.

2. Combining and using the ingredients herein described, substantially as and for the purpose set forth.

D. E. SOMES.

Witnesses:
CHARLES HERRON,
E. L. NORFOLK.